(12) United States Patent
Okajima et al.

(10) Patent No.: US 6,783,887 B2
(45) Date of Patent: Aug. 31, 2004

(54) METHOD AND APPARATUS FOR MANUFACTURING BATTERY MODULE AND UNIT BATTERY CELL FOR USE IN BATTERY MODULE

(75) Inventors: Hideki Okajima, Nishinomiya (JP); Takashi Oda, Kato-gun (JP); Yukichi Uesugi, Tuna-gun (JP); Hitoshi Tanaka, Mihara-gun (JP); Yoshinobu Okumura, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 410 days.

(21) Appl. No.: 09/809,078

(22) Filed: Mar. 16, 2001

(65) Prior Publication Data

US 2001/0026889 A1 Oct. 4, 2001

(30) Foreign Application Priority Data

Mar. 30, 2000 (JP) ................................ P. 2000-094917
Sep. 8, 2000 (JP) ................................ P. 2000-273646

(51) Int. Cl.[7] .............................................. H01M 2/22
(52) U.S. Cl. ...................................... 429/122; 29/623.1
(58) Field of Search ................................ 429/122, 123, 429/149, 121; 29/623.1

(56) References Cited

FOREIGN PATENT DOCUMENTS

| JP | 62-26761 | 2/1987 |
|----|----------|--------|
| JP | 11-354097 | 12/1999 |
| JP | 2000-100416 | 4/2000 |

*Primary Examiner*—Randy Gulakowski
*Assistant Examiner*—Monique Wills
(74) *Attorney, Agent, or Firm*—Nixon & Vanderhye P.C.

(57) ABSTRACT

In the method for manufacturing the battery module according to this invention, after a pair of welding upper/lower electrodes 21, 22 or 23, 24 are arranged in contact on the cases 16, 16 of adjacent unit cells 10a, 10b of a plurality of unit cells aligned in a line, a welding current is passed between the pair of welding upper electrodes 21, 23 from a welding power source while both ends of the unit cells 10a, 10b, 10c are pressurized by pressurizing members 31, 32 under a prescribed pressure. Thus, Joule heat is generated at the contact portion between the bottom of the outer case 16 of the unit cell 10a and the positive polarity terminal 18 of the unit cell 10b so that the contact portion melts. Accordingly, the bottom of the outer case 16 of the unit cell 10a and the positive polarity terminal 18 of the unit cell 10b are welded to each other at the contact portion.

13 Claims, 8 Drawing Sheets

METHOD AND APPARATUS FOR MANUFACTURING BATTERY MODULE AND UNIT BATTERY CELL FOR USE IN BATTERY MODULE

BACKGROUND OF THE INVENTION

1. Field of the Invention

This invention relates to a method for manufacturing a battery module composed of unit cells and an apparatus for manufacturing it to which the method can be applied. The unit cells are each composed of a metallic case incorporating cell elements such as a positive electrode, a negative electrode, a separator, an electrolyte, etc. and an terminal with one polarity and a sealing body sealing an opening of the case through an insulating body and serving a terminal with the other polarity, and connected in series by welding the sealing body of the one of the adjacent unit cells and the case of the other thereof. This invention also relates to the unit cell for use in the battery module to which these manufacturing method and apparatus can be effectively applied.

2. Description of the Related Art

Generally, the alkaline battery such as a nickel-hydride battery and nickel-cadmium battery is constructed so that an electrode body is formed by winding spirally a positive electrode and a negative electrode with a separator interposed therebetween and connecting a collector to the end of the positive electrode or negative electrode; with the batterybody housed in a metallic case, a lead portion extending from the collector is welded to a sealing body; and thereafter the sealing body is mounted in an opening of a battery case through an insulating gasket so that it is hermetically sealed. Where such an alkaline battery is used in an electric tool and an electric vehicle, it needs high power. For this reason, the battery is generally used as a battery module composed of unit cells connected in series.

Figure 10:
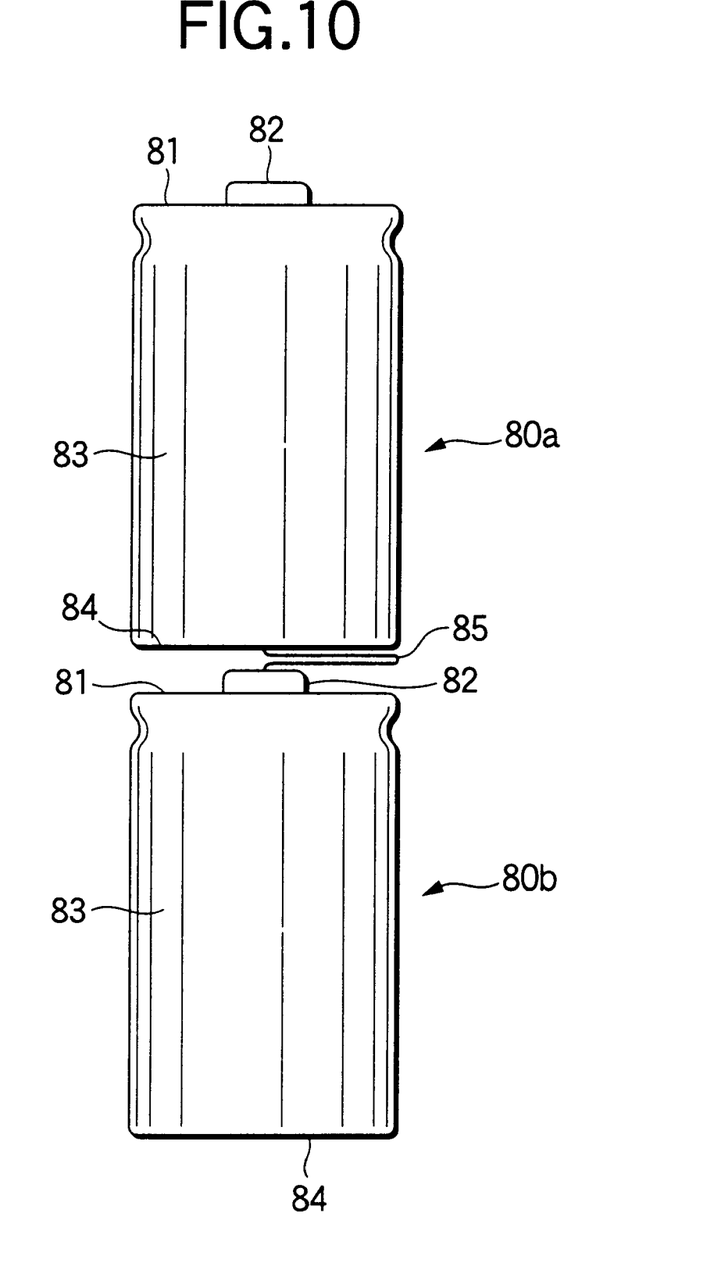

Such a battery module is manufactured, as shown in FIG. 10, in such a manner that one end of a lead plate 85 is welded to a positive polarity cap 82 which is provided as a positive polarity terminal on a sealing plate 81 of a unit cell 80b, the other end of the lead plate 85 is welded on a bottom 84 of a metallic case 83 of a unit cell 80a, and thereafter the central portion of the lead plate 85 is bent in an U-shape so that the plurality of unit cells 80a and 80b are connected.

Meanwhile, when the plurality of unit cells 80a and 80b are discharged through the lead plate 85 bent in a U-shape, a discharged current flows through the lead plate 85. Therefore, the drop of the voltage across a resistor becomes large as the lead plate 85 becomes long or thin. Where the discharging current is small, this voltage drop is not so problematic. However, where the battery is used in the electric tool or electric vehicle with a large current flowing, the voltage drop presented a problem of reducing an operating voltage.

In order to avoid such a problem, it was proposed to connect the unit cells directly by soldering the opposite electrodes to each other. However, the soldering presented a problem that it is difficult to assure the connection because of a small strength of a soldered portion. In addition, it was troublesome and poor in workability to connect the opposite electrodes of the unit cells.

As a result of various experiments, the inventors of this application developed an epoch-making welding technique of connecting the adjacent electrodes of unit cells directly by passing a welding current in a charging or discharging direction of a battery. As seen from FIG. 11, this welding technique is to align a plurality of unit cells 90a and 90b in a line housed in a holding cylinder not shown, and thereafter arrange one welding electrode 96 on a positive polarity cap 92 at the upper end of these unit cells and the other welding electrode 97 on a bottom 94 of a metallic case 93 at the lower end of these unit cells.

Figure 11:
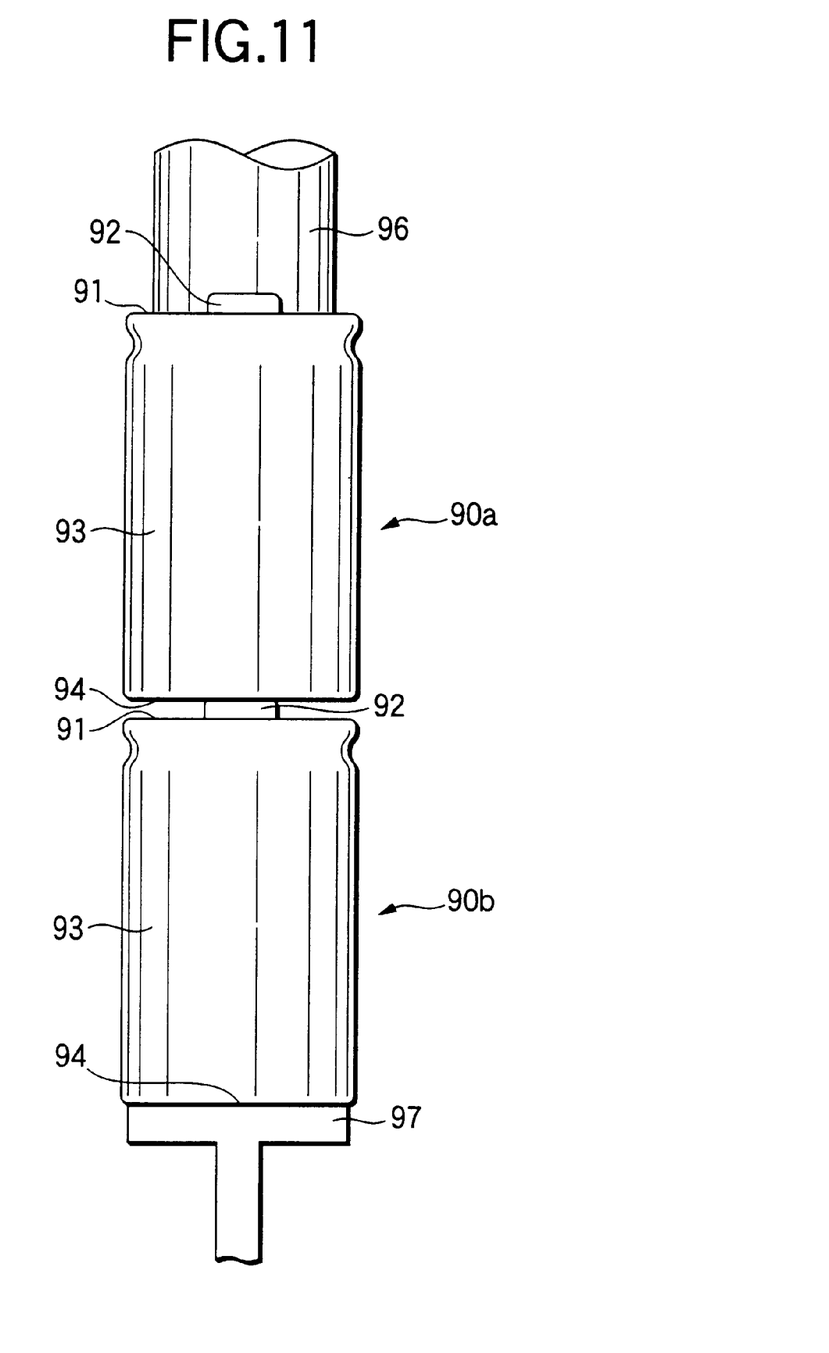
FIG. 11 is a front view of another conventional battery module.

Thereafter, this technique is to apply a voltage under applied pressure between both electrodes 96 and 97 to pass a large pulse current. Thus, the contact portions between the bottom 94 of the metallic case 93 of the unit cell 90a and the positive polarity cap 92 of the unit cell 90b are molten so that they are welded to each other.

This technique directly weld the adjacent electrodes of the unit cells so that the voltage drop at the welding portion is reduced, thereby improving the operating voltage of the battery module.

However, the method for manufacturing a battery module as shown in FIG. 11, in which the pair of welding electrodes 96 and 97 serve as pressurizing members, presented a problem that it is difficult to adjust accurately the pressure to be applied between the plurality of unit cells 90a and 90b. Specifically, excessively large pressurizing force applied between the plurality of unit cells 90a and 90b give excessively large pressurizing force to the positive polarity cap 92. This presented a problem that the positive polarity cap 92 is shrunk or deformed. Since a pressure valve is arranged in the positive polarity cap 92, this led to another problem that the pressure valve does not operate properly.

On the other hand, excessively small pressurizing force applied between the plurality of unit cells 90a and 90b presented a problem that the terminals of the adjacent unit cells are not welded sufficiently to each other to generate poor welding. This is because impossibility of applying sufficient pressurizing force between the plurality of unit cells 90a and 90b increases the contact resistance at the welding portion and hence voltage drop so that sufficient current cannot be supplied to this portion. Therefore, where the number of unit cells to be connected is increased to provide a battery module with a high voltage, the number of the connecting portions is increased. This further makes it impossible to supply the welding current and further generates the poor welding.

Further, since the plurality of unit cells 90a, 90b inserted in a holding cylinder are aligned in a line, there was a problem that when the inner diameter of the holding cylinder is smaller than the outer diameter of the unit cells 90a, 90b, it is difficult to insert the unit cells 90a and 90b into the holding cylinder, and inversely, when the inner diameter of the holding cylinder is excessively larger than the outer diameter of the unit cells 90a, 90b, the unit cells 90a, 90b cannot be aligned in a line within the holding cylinder.

This invention has been accomplished in order to solve the problems described above.

SUMMARY OF THE INVENTION

The first object of this invention is to provide a method of welding a battery module which can easily weld a large number of unit cells without injuring them and generating poor welding when they are welded.

The second object of this invention is to provide a manufacturing apparatus capable of realizing such a manufacturing method.

Further, the third object of this invention is to provide a connecting structure of the battery to which these method and apparatus can be applied effectively applied.

In order to attain the first object, the method for manufacturing a battery module comprises the steps of:

preparing a plurality of unit cells each provided with a case serving as a terminal with one polarity and incorporating cell elements with a positive electrode and a negative electrode with an electrolyte interposed therebetween and a sealing body serving as a terminal with the other polarity electrically isolated from the case;

aligning the plurality of unit cells in a line so that their adjacent terminals are brought into contact with each other; and welding the adjacent terminals to each other by passing a welding current through at least one battery elements of the plurality of unit cells aligned in a line.

Preferably, the step of aligning is to align the plurality of unit cells in a line so that the bottom of the case with the one polarity of the one unit cell of the adjacent unit cells is brought into contact with the terminal with the other polarity of the other unit cell; and comprises a welding electrode arranging step of arranging a pair of welding electrodes so that they are brought into contact with the surfaces of the cases of any two unit cells of the plurality of unit cells aligned in a line, respectively; and welding the plurality of unit cells at their both ends located between the welding electrodes to each other by passing a welding current between the welding electrodes.

Preferably, the welding electrode arranging step is to arrange the welding electrodes on one of the terminals of outermost unit cells of the plurality of unit cells and the side wall of one of the other units thereof.

Preferably, the welding electrode arranging step is to arrange a pair of welding electrodes so that they are brought into contact with the surfaces of the cases of any two unit cells of the plurality of unit cells aligned in a line, respectively.

Namely, the method for manufacturing a battery module according to this invention, comprises:

a welding electrode arranging step of arranging a pair of welding electrodes so that they are brought into contact with the metallic cases of any two unit cells of the plurality of unit cells aligned in a line; and a welding step of passing a welding current between the pair of welding electrodes of the plurality of unit cells aligned in a line while both ends of the plurality of unit cells aligned in a line are pressurized by pressurizing means.

When both ends of the plurality of unit cells aligned in a line are pressurized under a prescribed pressure, the bottom of the metallic case of each of the unit cells aligned in a line and the sealing body are brought into intimate contact with each other. In this case, when the welding current is passed between the pair of welding electrodes, Joule heat is generated at the contact portion between the bottom of the outer case and the sealing body so that the contact portion melts. As a result, the bottom of the outer case of the one unit cell and the sealing body of the other unit cell of the unit cells are directly welded to each other, the unit cells being located between any two unit cells on which the welding electrodes are arranged. As a result, without using the lead plate for welding, the bottom of the outer case of the one unit cell and the sealing body of the other unit cell are directly welded to each other so that the voltage drop at the welding portion lowers. Accordingly, a battery module composed of a large number of unit cells with a low internal resistance can be obtained.

In this case, when the welding voltage is applied between the pair of welding electrodes, the welding current flows from the outer case of the unit cell on which the one welding electrode is arranged through the interior of a unit cell located between any two unit cells on which these welding electrodes are located, the interior of the unit cell on which the other welding electrode is arranged and the outer case thereof. Therefore, in order to provide a battery module with sufficient welding strength, a pair of welding have only to be arranged so that they are kept in intimate contact with the surfaces of the metallic cases of any two unit cells.

Incidentally, when a pair of welding electrodes are arranged so that they are kept in intimate contact with the surfaces of the metallic cases of two unit cells adjacent to each other directly or with a single unit cell interposed therebetween, the number of the welding portions residing between the welding electrodes can be reduced. This makes it possible to reduce the welding voltage to be applied between the welding electrodes and shorten the collecting distance of the welding current flowing between the welding electrodes. As a result, supply of a prescribed welding current makes it possible to form the welding portion with sufficient welding strength.

Meanwhile, in the case where a plurality of unit cells are aligned in a line, when the outer case of one unit cell and that of the other unit cell are in contact with each other, the welding current passed between a pair of welding electrodes does not flow into the contact portion between the outer case serving as the terminal with the one polarity of the unit cell and the terminal with the other terminal of the other unit cell. The unit cells are not welded at the contact portion. In order to avoid this, the unit cells must be brought into contact with each other only at the contact portion between the outer case serving as the terminal with the one polarity of the unit cell and the terminal with the other terminal of the other unit cell so that the welding current flow through the contact portion between the outer case serving as the terminal with the one polarity of the unit cell and the terminal with the other terminal of the other unit cell and the interior of the other unit cell.

In order to attain the second object, the apparatus for manufacturing a battery module according to this invention comprises: a pair of lower welding electrodes where any two unit cells of the plurality of unit cells aligned in a line are placed and fixed, a pair of lower welding electrodes arranged at the positions corresponding to the pair of lower welding electrodes, a welding power source for supplying a welding current to at least one of the pair of lower welding electrodes and the pair of upper welding electrodes, and pressurizing means for pressurizing, under a prescribed pressure, both ends of the plurality of unit cells connected in series which are placed on the pair of lower welding electrodes.

Since a pair of lower welding electrodes where any two unit cells of the plurality of unit cells aligned in a line are placed and fixed, the unit cells adjacent to each other can be placed on the pair of lower welding electrodes. Further, since a pair of lower welding electrodes are arranged at the positions corresponding to the pair of lower welding electrodes and pressurizing means is provided for pressurizing, under a prescribed pressure, both ends of the plurality of unit cells connected in series which are placed on the pair of lower welding electrodes, the welding current can be supplied to at least one of the pair of lower welding electrodes and the pair of the upper welding electrode.

In this configuration, when the welding power source is driven, Joule heat is generated at the contact portion between the outer case serving as the terminal with the one polarity of the unit cell and the terminal with the other terminal of the other unit cell so that the contact portion melts and hence the one unit cell and the other unit cell are welded to each other.

Meanwhile, when the pair of lower welding electrodes or the pair of upper welding electrodes are kept in contact with each other, the welding current passed between either one of the pair of welding electrodes leads to a short-circuited state, the welding current does not flow into the contact portion between the outer case serving as the terminal with the one polarity of the unit cell and the terminal with the other terminal of the other unit cell. In order to avoid this, the insulating susceptor where the unit cells are placed and fixed must be arranged between at least the pair of lower welding electrodes. Thus, it is possible to prevent the pair of lower welding electrodes or the pair of upper welding electrodes from being brought into contact with each other.

In order to attain the third object, the unit cell according to this invention is designed so that at least one of the positive polarity terminal and the negative polarity terminal of the unit cell is provided with a projection which projects outwardly from the terminal. Now, where a welding current is supplied to the contact portion between the outer case serving as the terminal with the one polarity of the unit cell and the terminal with the other terminal of the other unit cell, the more the welding current is supplied to the contact portion, the more surely the welding can be made. This improves the welding intensity.

However, when these terminals are kept in contact with each other in plane, the current density at the contact portion becomes small so that sufficient welding strength cannot be obtained. On the other hand, when at least one of the positive polarity terminal and the negative polarity terminal is provided with a projection which projects outwardly from the terminal, the welding current intensively flows at the projection. This increases the current density at the contact portion, thereby providing a sufficient welding strength.

Further the terminals of the same polarity in said adjacent cells can be connected with each other.

DESCRIPTION OF THE PREFERRED EMBODIMENTS

Figure 1:
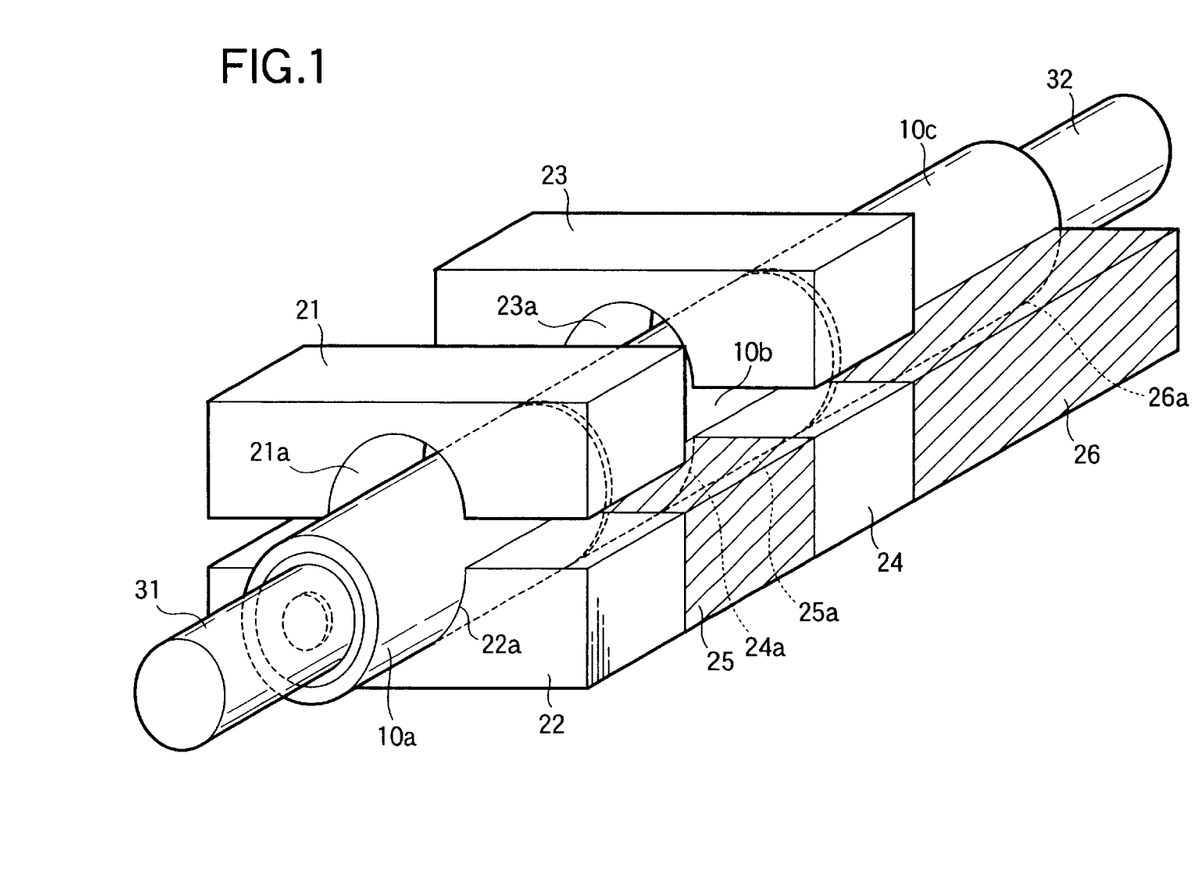
FIG. 1 is a schematic perspective view showing a first embodiment of a welding apparatus according to this invention for a manufacturing a battery module.
Figure 2:
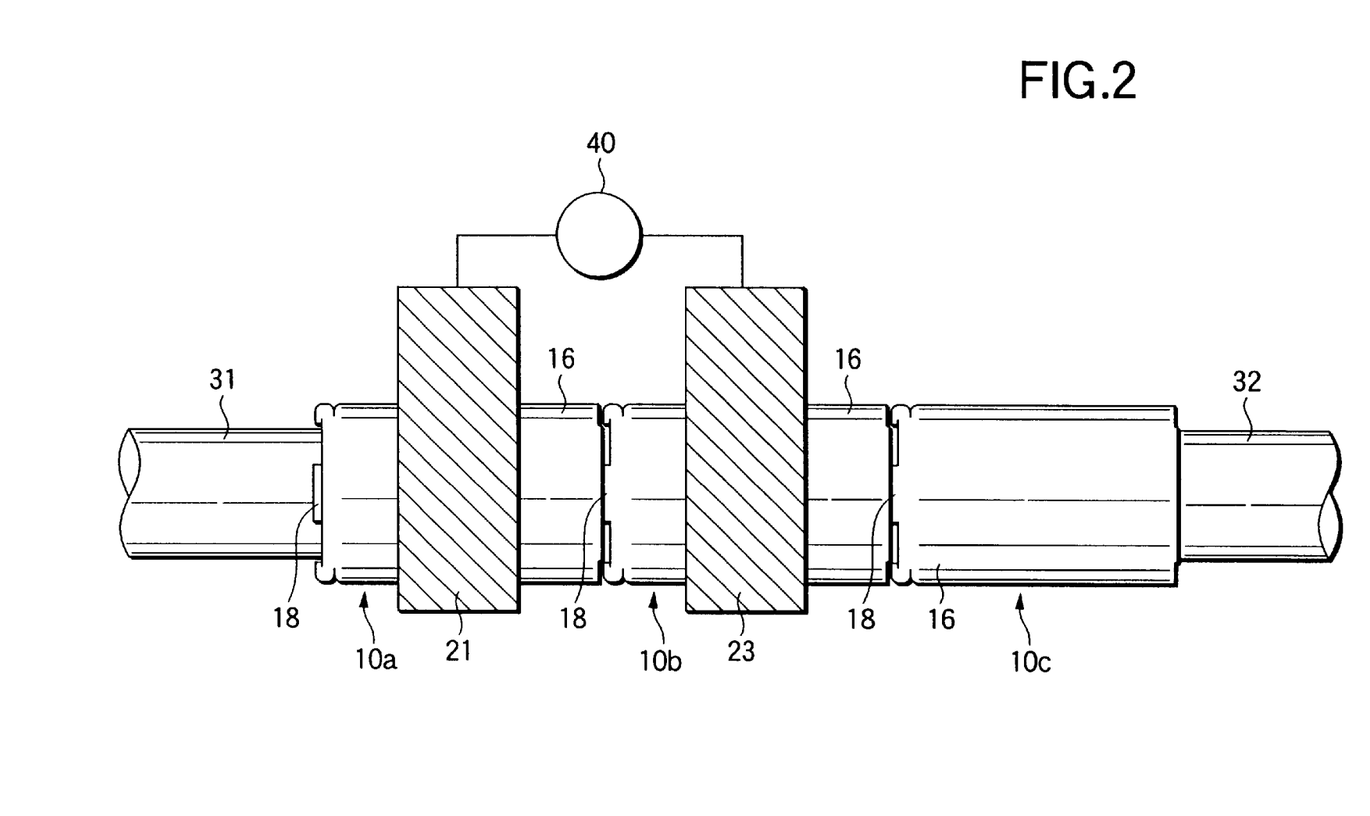
FIG. 2 is a top view showing the state where adjacent unit cells of the battery module are welded to each other.
Figure 3:
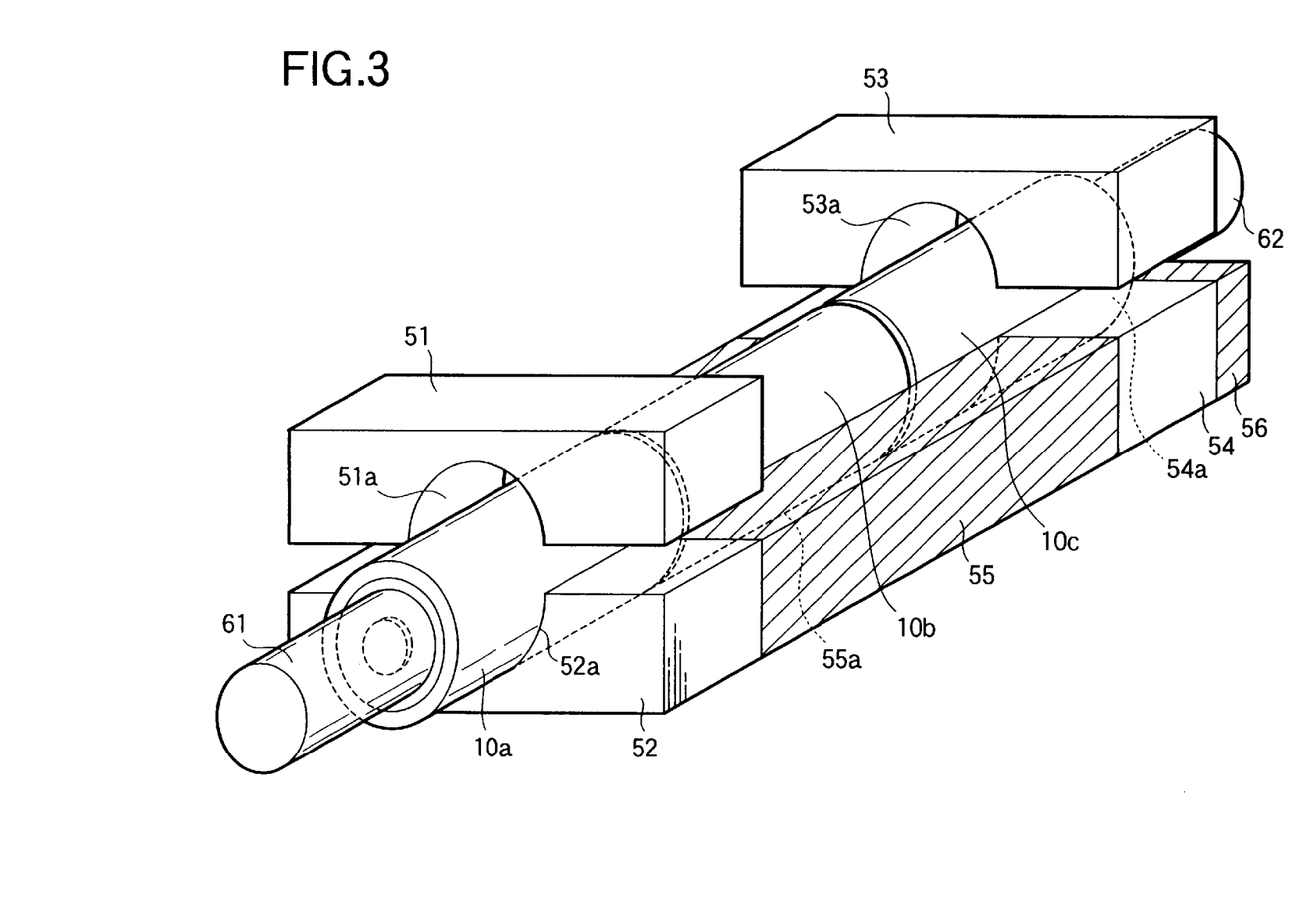
FIG. 3 is a schematic perspective view showing a second embodiment of a welding apparatus according to this invention for a manufacturing a battery module.
Figure 4:
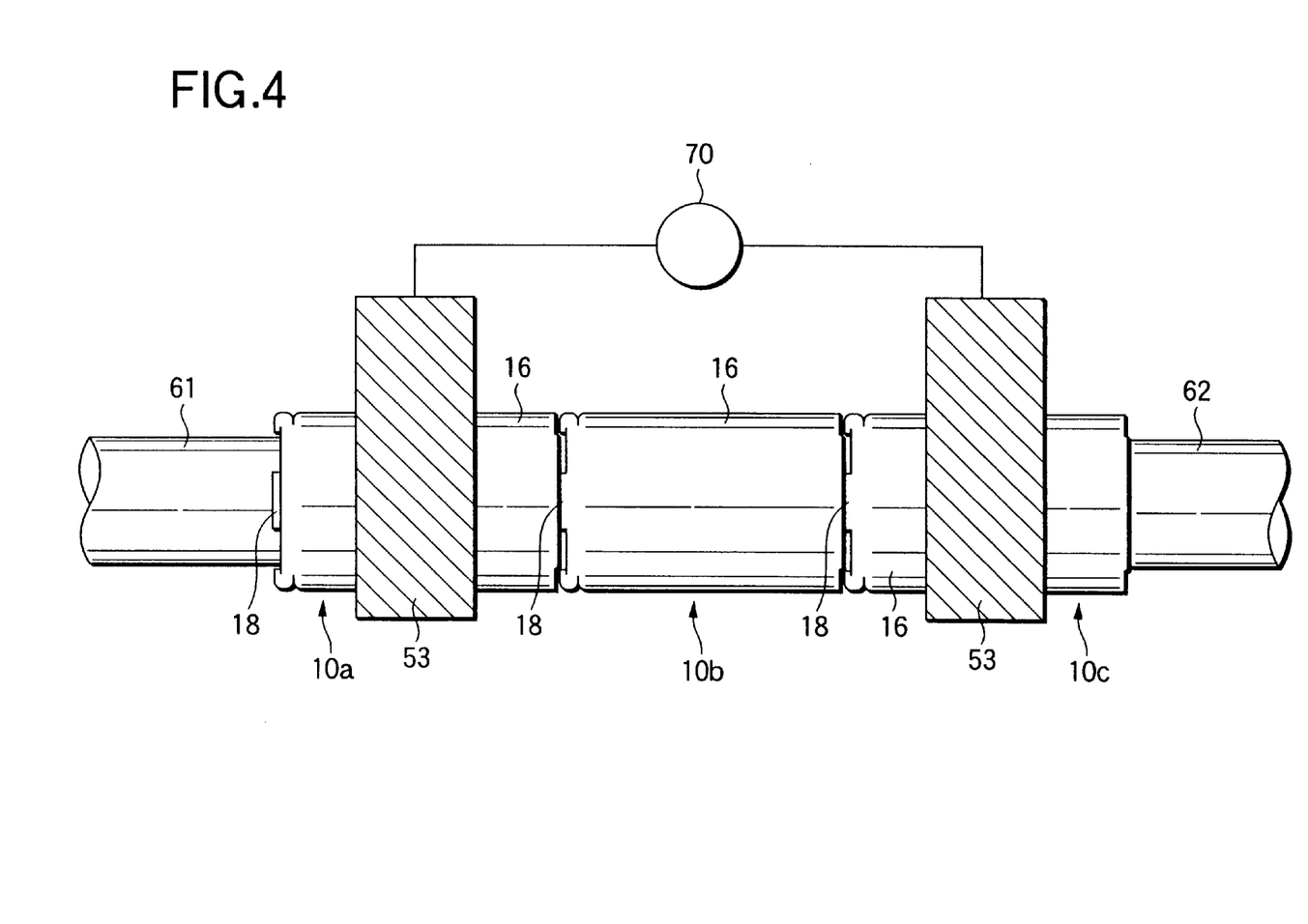
FIG. 4 is a top view showing the state where adjacent unit cells of the battery module are welded to each other.
Figure 5:
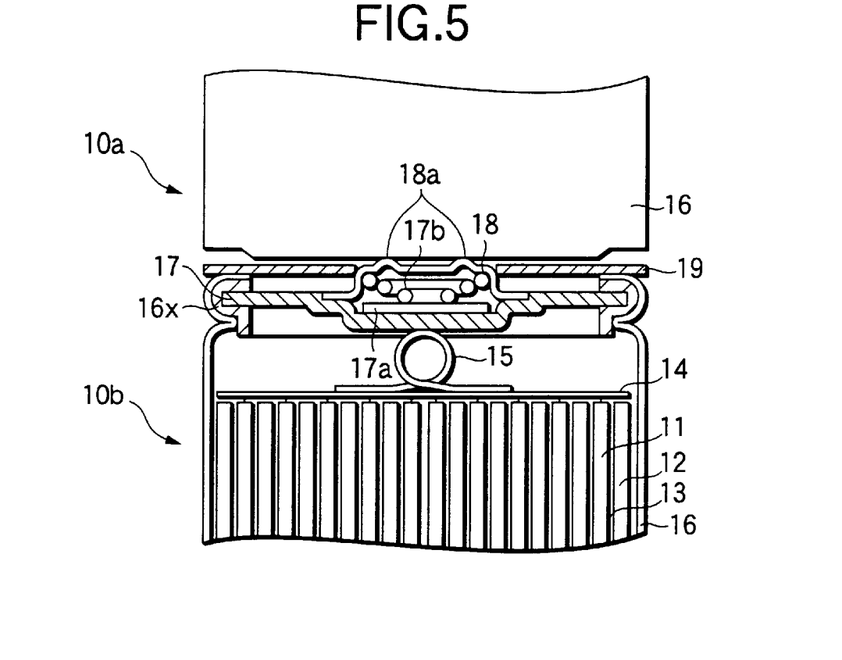
FIG. 5 is an enlarged sectional view of the connecting portion between the unit cells of an example of the battery module which is manufactured by the apparatus shown in FIG. 1 or FIG. 3.
Figure 6:
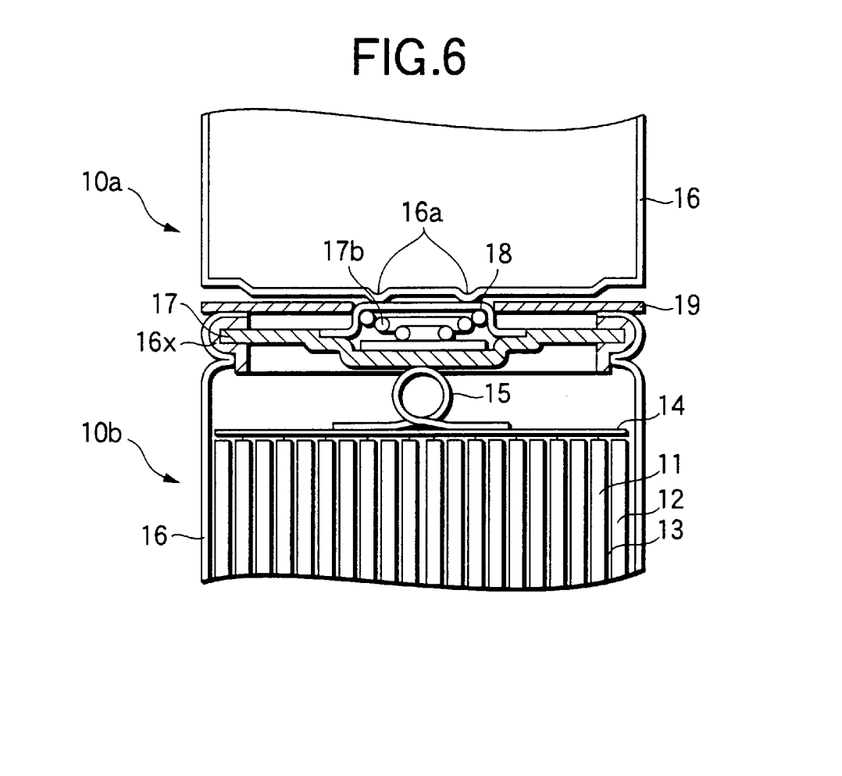
FIG. 6 is an enlarged sectional view of the connecting portion between the unit cells of another example of the battery module which is manufactured by the apparatus shown in FIG. 1 or FIG. 3.
Figure 7A:
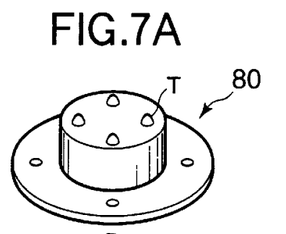
FIGS. 7A–D are views of a connecting member used in the variation 3 of the present invention.
Figure 7B:
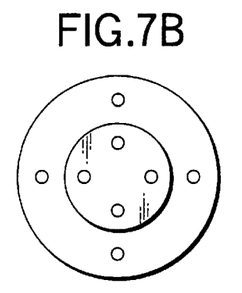
Figure 7C:
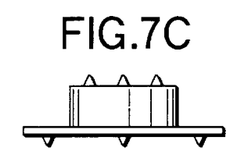
Figure 7D:
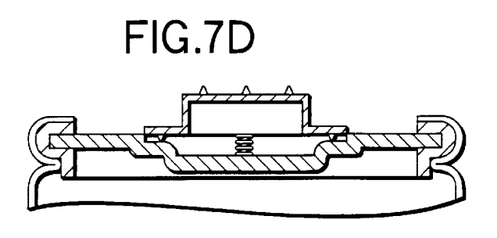

Now referring to FIGS. 1 to 6, an explanation will be given of various embodiments. FIG. 1 is a schematic perspective view of a first embodiment of the welding apparatus according to this invention. FIG. 2 is a top view showing the manner of welding unit cells of a battery module are welded to each other using the apparatus shown in FIG. 1. FIG. 3 is a schematic perspective view of a second embodiment of the welding apparatus according to this invention. FIG. 4 is a top view showing the manner of welding unit cells of a battery module are welded to each other using the apparatus shown in FIG. 1. FIG. 5 is an enlarged sectional view of a connecting portion of a unit cell constituting the battery module using the apparatus shown in FIGS. 1 and 3. FIG. 6 is an enlarged sectional view of a connecting portion of another unit cell constituting the battery module using the apparatus shown in FIGS. 1 and 3.

1. Embodiment 1

As shown in FIG. 1, a welding apparatus of the first embodiment for manufacturing a battery module according to this invention includes a pair of welding electrodes composed of a welding upper/lower electrode with one polarity (consisting of a welding upper electrode 21 and a welding lower electrode 22) and another upper/lower electrode with another polarity (consisting of a welding upper electrode 23 and a welding lower electrode 24); an insulating susceptor (holder) 25 of an insulator arranged between the respective lower electrodes 22 and 24; an insulating susceptors 26 arranged outside each of the welding lower electrodes 22 and 24; a pair of pressurizing members 31 and 32 for pressurizing both ends of each of unit cells 10a, 10b and 10c which are aligned in a line of a series connection to constitute the battery module; and a welding power source 40 (see FIG. 2) for supplying a welding current to the pair of welding upper electrodes 21, 23 or the pair of welding lower electrodes 22 and 24.

The welding lower electrodes 22, 24 are each formed in a prism of a metallic material with good conductivity such as copper. At the central portion of the prism, a groove 22a, 24a which corresponds to the outer shape of the lower half of each unit cell 10a, 10b, 10c is formed in a direction of arranging the unit cells. Like the welding lower electrodes 22, 24, the welding upper electrodes 21, 23 are each formed in a prism of a metallic material with good conductivity such as copper. At the central portion of the prism, a groove 21a, 23a which corresponds to the outer shape of the upper half of each unit cell is formed in the direction of arranging the unit cells.

The welding upper electrode 21, 23 is placed on the welding lower electrode 22, 24 so that the space formed by the grooves 22a and 21a and the space formed by the grooves 24a and 23a corresponds to the outer shape of the unit cell 10a, 10b, 10c.

Thus, the unit cell 10a (10b, 10c) is arranged on the groove 22a of the welding lower electrode 22 and the welding upper electrode 21 is placed thereon so that the unit cell 10a (10b, 10c) is fixed. The unit cell 10b (10a, 10c) is arranged on the groove 24a of the welding lower electrode 24 and the welding upper electrode 23 is placed thereon so that the unit cell 10b (10a, 10c) is fixed.

The insulating susceptors 25, 26 are each formed in a prism of an insulating material such as synthetic resin, ceramic, etc. At the central portion of the prism, a groove 25a, 26a which corresponds to the outer shape of the lower half of each unit cell 10a, 10b, 10c is formed in the direction of arranging the unit cells. Incidentally, in FIGS. 1 and 2, the battery module is constituted by three units 10a, 10b and 10c which are placed on the insulating susceptors 25 and 26. On the other hand, where the battery module is constituted by four or more unit cells to be connected, other insulating susceptors may be used in addition to the insulating susceptors 25 and 26.

A pressurizing member 31, 32 is made of metal, synthetic resin, ceramic, etc. having a prescribed strength. After the unit cells 10a, 10b, 10c are arranged/aligned in a line on the welding lower electrode 22, 24 and the insulating susceptor 25 and 26, the pressuring member 31 is pressed on a sealing plate 17 of the unit cell 10a and the pressurizing member 32 is pressed on the outer case 16 of the unit cell 10c. Thus, the unit cells 10a, 10b and 10c are pressed. At least one of the pressurizing members 31 and 32 are pressurized by a pressurizing means such as a coil spring, air cylinder, etc. The welding power source 40 is a DC power source which serves to apply a Dc voltage having a prescribed voltage to the battery module so that a DC pulse current of 3 KA flows for about 15 msec between the pair of welding electrodes (now, between the welding upper electrodes 21 and 23).

Now referring to FIGS. 1 and 2, an explanation will be given of a process of manufacturing a battery module using the welding apparatus according to the first embodiment described above.

First, the welding lower electrode 22, insulating susceptor 25, welding lower electrode 24 and insulating susceptor 26 are aligned in a line in this order. Thereafter, the unit cell 10a is placed on the groove 22a of the welding lower electrode 22. The unit cell 10b is placed on the groove 25a of the insulating susceptor 25 and the groove 24a of the welding lower electrode 24. The unit cell 10c is placed on the groove 26a of the insulating susceptor 26. Incidentally, as seen from FIGS. 3 and 4, an insulating plate 19 having an opening formed so that only a positive polarity cap 18 is kept in contact with the bottom of an outer case 16 is arranged between the unit cells 10a and 10b and between the unit cells 10b and 10c, respectively.

The welding upper electrode 21 is placed on the welding lower electrode 22 and the welding upper electrode 23 is placed on the welding lower electrode 24 so that these electrodes are brought into contact with the surface of the outer cases 16 of the unit cells 10a and 10b. The pressurizing member 31 is pressed on the sealing plate 17 of the unit cell 10a and the pressurizing member 32 is pressed on the bottom of the outer case 16 of the unit cell 10c. Thus, at least one of the pressurizing members 31 and 32 is pressurized by a pressuring member such as a coil spring or air cylinder so that the unit cells 10a, 10b and 10c are pressed by a prescribed pressure (e.g. $1 \times 10^5 N/m^2 \sim 5 \times 10^5 N/m^2$). Incidentally, the one terminal of a connecting code which extends from the welding power source 40 is connected to the welding upper electrode 21 whereas the other terminal thereof is connected to the welding upper electrode 23.

When the welding power source 40 is operated, a DC voltage with a prescribed voltage value is applied between the welding upper electrode 21 and welding upper electrode 23. Thus, a DC pulse current of 3 KA flows for about 15 msec in a direction (or opposite direction thereto) of the welding upper electrode 21→outer case 16 of the unit cell 10a→contact portion between the bottom of the outer case 16 of the unit cell 10a and the positive polarity cap 18 of the unit cell 10b→interior of the unit cell 10b→outer case 16 of the unit cell 10b→welding upper electrode 23. This generates Joule heat at the contact portion between the bottom of the outer case 16 of the unit cell 10a and positive polarity cap 18 of the unit cell 10b. Then, then contact portion melts so that the unit cells 10a and 10b are welded at the contact portion therebetween (i.e. contact portion between the bottom of the outer case 16 of the unit cell 10a and positive polarity cap 18 of the unit cell 10b).

The insulting stand 26, welding lower electrode 22, insulating susceptor 25 and welding lower electrode 24 are aligned in a line again in this order. The welded unit cells 10a and 10b are placed on the groove 26a of the insulating susceptor 26, and groove 22a of the welding lower electrode 22, and the unit cell 10c is placed on the groove 25a of the insulating susceptor 25 and groove 24a of the welding lower electrode 24. Thereafter, likewise, the welding upper electrodes 21 and 23 are placed on the welding lower electrodes 22 and 24, respectively and the pressurizing members 31 and 32 are pressed on the structure. In this state, the welding power source 40 is operated. Thus, the unit cells 10b and 10c are welded at the contact portion therebetween (i.e. contact portion between the bottom of the outer case 16 of the unit cell 10b and the positive polarity cap 18 of the unit cell 10c). Accordingly, the battery module composed of three units connected in series is completed.

As described above, in accordance with the first embodiment, the pair of welding upper and lower electrodes 21, 22 or 23, 24 are arranged in contact on the metallic cases 16, 16 of the adjacent unit cells of the plurality of unit cells aligned in a line. Thereafter, with both ends of the unit cells 10a, 10b and 10c aligned in a line being pressurized by a prescribed pressure, a welding current is passed between the pair of welding upper electrodes 21 and 23. Therefore, the welding current flows in a direction from the welding upper electrode 21 to the welding upper electrode 23 through the contact portion between the bottom of the outer case 16 of the unit cell 10a (10b) and the positive polarity terminal 18 of the unit cell 10b (10c) and the interior of the unit cell 10b (10c), or in the direction opposite thereto.

This generates Joule heat at the contact portion between the bottom of the outer case 16 of the unit cell 10a (10b) and positive polarity cap 18 of the unit cell 10b (10c). Then, then contact portion melts so that the unit cells 10a (10b) and 10b (10c) are welded at the contact portion therebetween. Thus, the unit cells 10a and 10b are directly welded without using the lead plate for welding so that the voltage drop is reduced at the welding portion. As a result, the battery module with low internal resistance which is composed of a large number of unit cells connected in series can be obtained.

2. Embodiment 2

In the first embodiment described above, the welding was made between the adjacent unit cells 10a, 10b (10b, 10c) adjacent to each other. However, in accordance with this invention, the welding can be made between any two unit cells. In accordance with the second embodiment of this invention, referring to FIGS. 3 and 4, an explanation will be given of an example in which the welding is made between two unit cells adjacent to each other with a single unit cell interposed therebetween.

As seen from FIG. 3, a welding apparatus of the second embodiment for manufacturing a battery module according to this invention includes a pair of welding electrodes composed of a welding upper/lower electrode with one polarity (consisting of a welding upper electrode 51 and a welding lower electrode 52) and another upper/lower electrode with another polarity (consisting of a welding upper electrode 53 and a welding lower electrode 54); an insulating susceptor 55 of an insulator arranged between the welding lower electrodes 52 and 54; an insulating susceptor 56 arranged outside each of the welding lower electrodes 52 and 54; a pair of pressurizing members 61 and 62 for pressurizing both ends of each of unit cells 10a, 10b and 10c which are aligned in a line of a series connection to constitute the battery module; and a welding power source 70(see FIG. 4) for supplying a welding current to the pair of welding upper electrodes 51, 53 or the pair of welding lower electrodes 52 and 54.

The welding lower electrodes 52, 54 are each formed in a prism of a metallic material with good conductivity such as copper. At the central portion of the prism, a groove 52a, 54a which corresponds to the outer shape of the lower half of each unit cell 10a, 10b, 10c is formed in a direction of arranging the unit cells. Like the welding lower electrodes 52, 54, the welding upper electrodes 51, 53 are each formed in a prism of a metallic material with good conductivity such as copper. At the central portion of the prism, a groove 51a, 53a which corresponds to the outer shape of the upper half of each unit cell is formed in the direction of arranging the unit cells.

The welding upper electrode 51, 53 is placed on the welding lower electrode 22, 24 so that the space formed by the grooves 52a and 51a and the space formed by the grooves 54a and 53a corresponds to the outer shape of the unit cell 10a, 10b, 10c.

Thus, the unit cell 10a is arranged on the groove 52a of the welding lower electrode 52 and the welding upper electrode 51 is placed thereon so that the unit cell 10a is fixed. The unit cell 10c is arranged on the groove 54a of the welding lower electrode 54 and the welding upper electrode 53 is placed thereon so that the unit cell 10c is fixed.

The insulating susceptors 55, 56 are each formed in a prism of an insulating material such as synthetic resin, ceramic, etc. At the central portion of the prism, a groove 55a, 56a which corresponds to the outer shape of the lower half of each unit cell 10a, 10b, 10c is formed in the direction of arranging the unit cells. It should be noted that the insulating susceptor 55 has a length larger than that of the insulating placing susceptor 25 in the first embodiment, which is enough to place a single or more unit cells thereon. Incidentally, in FIGS. 3 and 4, the battery module is constituted by three units 10a, 10b and 10c which are placed on the insulating susceptors 55 and 56. On the other hand, where the battery module is constituted by four or more unit cells to be connected, other insulating susceptors may be used in addition to the insulating susceptors 25 and 26. Further, the insulating susceptor 56 may be used as the occasion demands because the battery module can be formed without using it.

A pressurizing member 61, 62 is made of metal, synthetic resin, ceramic, etc. having a prescribed strength. After the unit cells 10a, 10b, 10c are arranged/aligned in a line on the welding lower electrode 52, 54 and the insulating susceptor 55 and 56, the pressuring member 61 is pressed on a sealing plate 17 of the unit cell 10a and the pressurizing member 62 is pressed on the outer case 16 of the unit cell 10c. Thus, the unit cells 10a, 10b and 10c are pressed. At least one of the pressurizing members 61 and 62 are pressurized by a pressurizing means such as a coil spring, air cylinder, etc. The welding power source 70 is a DC power source which serves to apply a DC voltage having a prescribed voltage to the battery module so that a DC pulse current of 3 KA flows for about 15 msec between the pair of welding electrodes (now, between the welding upper electrodes 51 and 53).

An explanation will be given of a process of manufacturing a battery module using the welding apparatus according to the second embodiment described above.

First, the welding lower electrode 52, insulating susceptor 55, welding lower electrode 54 and insulating susceptor 56 are aligned in a line in this order. Thereafter, the unit cell 10a is placed on the groove 52a of the welding lower electrode 52. The unit cell 10b and a part of the unit cell 10c are placed on the groove 55a of the insulating susceptor 55. The remaining part of the unit cell 10c is placed on the groove 54a of the welding lower electrode 54 and groove 56a of the insulating susceptor 56. Incidentally, in this case, as seen from FIG. 5 and 6, an insulating plate 19 having an opening formed so that only a positive polarity cap 18 is kept in contact with the bottom of the outer case 16 opposite thereto is arranged between the unit cells 10a and 10b and between the unit cells 10b and 10c, respectively.

The welding upper electrode 51 is placed on the welding lower electrode 52 and the welding upper electrode 53 is placed on the welding lower electrode 54 so that the unit cells 10a and 10c are fixed. The pressurizing member 61 is pressed on the sealing plate 17 of the unit cell 10a and the pressurizing member 62 is pressed on the bottom of the outer case 16 of the unit cell 10c. Thus, at least one of the pressurizing members 61 and 62 is pressurized by a pressuring member such as a coil spring or air cylinder so that the unit cells 10a, 10b and 10c are pressed by a prescribed pressure (e.g. $1 \times 10^5 \text{N/m}^2 \sim 5 \times 10^5 \text{N/m}^2$). Incidentally, the one terminal of a connecting code which extends from the welding power source 70 is connected to the welding upper electrode 51 whereas the other terminal thereof is connected to the welding upper electrode 53.

When the welding power source 70 is operated, a DC voltage with a prescribed voltage value is applied between the welding upper electrode 51 and welding upper electrode 53. Thus, a DC pulse current of 3 KA flows for about 15 msec in a direction (or opposite direction thereto) of the welding upper electrode 51→outer case 16 of the unit cell 10a→contact portion between the bottom of the outer case 16 of the unit cell 10a and the positive polarity cap 18 of the unit cell 10b→interior of the unit cell 10b→outer case 16 of the unit cell 10c→welding upper electrode 53. This generates Joule heat at the contact portions between the bottom of the outer case 16 of the unit cell 10a and positive polarity cap 18 of the unit cell 10b and between the bottom of the unit cell 10b and the positive polarity cap 18 of the unit cell 10c. Then, these contact portions melt.

Thus, the unit cells 10a and 10b and the unit cells 10b and 10c are simultaneously welded at the contact portions therebetween (i.e. contact portion between the bottom of the outer case 16 of the unit cell 10a and positive polarity cap 18 of the unit cell 10b and contact portion between the bottom of the outer case 16 of the unit cell 10b and positive polarity cap 18 of the unit cell 10c), respectively. Thus, without realigning/rearranging the welding lower electrodes 52, 54 and insulating susceptors 55, 56 as in the first embodiment, the welding made once permits the battery module of three unit cells welding in series to be created. Adjusting the length of the insulating susceptor 55 permits a plurality of unit cells arranged between any two unit cells to be welded simultaneously.

In the embodiments described above, after the unit cells 10a, 10b and 10c are aligned in a line, the welding upper electrodes 21 and 23 (51 and 53) were placed on the welding lower electrodes 22 and 24 (52 and 54) and thereafter with the these unit cells pressurized by the pressurizing members 31 and 32 (61 and 62), the welding current was passed between the welding upper electrodes 21 and 23 (51 and 53). However, after the unit cells 10a, 10b and 10c are aligned in a line and pressurized by the pressurizing members 31 and 32 (51 and 53), with the welding upper electrodes 21 and 23 (51 and 53) placed on the welding lower electrodes 22 and 24 (52 and 54), the welding current may be passed between the welding upper electrodes 21 and 23 (51 and 53), thereby providing the same result. In short, it is important that the unit cells 10a, 10b and 10c are welded at their contact portions in a state where they are pressurized.

In the above example, each of the grooves 21a, 22a, 23a and 24a (51a, 52a, 53a and 54a) formed in the welding electrodes 21, 22, 23 and 24 (51, 52, 53 and 54), respectively and the grooves 25a and 26a (55a and 56a) formed in the insulating susceptors 25 and 26 (55 and 56), respectively has a semicircular shape in section which accords with the outer shape of each of the unit cells 10a, 10b and 10c as shown in FIG. 1 (FIG. 3). However, its sectional shape should not be limited to the semicircle, but may be various shapes such as an ellipse, a triangle and a trapezoid. In short, the sectional shape may be any shape as long as it permits the unit cells 10a, 10b, 10c to be placed stably and provides a good contact between the adjacent ones of the units cells 10a, 10b and 10c.

In the above example, the battery module was composed of only three units. However, it is apparent that this invention can be applied to a battery module composed of any number of unit cells. In this case, any additional insulating susceptor may be used in addition to the insulating susceptors 25 and 26 (55 and 56). In short, any configuration is permitted as long as a pair of welding electrodes for welding the adjacent unit cells are insulated from each other.

In the above example, the welding was performed with a current of 3 KA for only about 15 msec. However, the same effect could be obtained when the current of 1 KA or more is passed regardless with the size of the battery. As regards the time of supplying the current, the same result can be obtained with the time of 5 m sec or longer. However, when the current is supplied for an excessively long (e.g. 1 sec), it exerts an adverse affect on the unit cells. Further, the power source for a welding current should not be limited to the DC power source, but may be an AC power source.

3. Unit Cell Suited to a Battery Module

Referring to FIG. 3, an explanation will be given of the unit suitable for manufacturing the battery module as described above, e.g. an nickel-hydrogen battery.

First, a nickel porous body is formed on the surface of a polarity plate core body of punching metal. Thereafter, by chemical impregnation, the nickel sintered porous body is filled with an active material mainly containing nickel hydroxide to form a nickel positive polarity plate 11. Further, the surface of the polarity plate of punching metal is filled with a paste negative polarity active material of an hydrogen occluded alloy and dried. Thereafter, it is rolled to reach a prescribed thickness to form a negative polarity plate 12 of the hydrogen occluded alloy.

These Ni positive polarity plate 11 and H occluded alloy negative polarity plate 12 with the separator 13 interposed are wound spirally to form a group of spiral electrodes. Thereafter, a positive polarity collector 14 is welded to the positive polarity cores exposed to the upper end surface of the group of spiral electrodes, and a negative polarity collector (not shown) is welded to the negative polarity core exposed to the lower end surface thereof. A positive polarity lead 15 which is machined to be cylindrical in its center portion is welded to the upper surface of the positive polarity collector 14. These elements are housed within a cylindrical bottomed outer case (the outer surface of the bottom is a negative polarity terminal) which is made of iron plated with nickel. The negative polarity collector welded to the H occluded alloy negative polarity plate 12 is welded to the inner bottom of the outer case 16.

A vibration preventing ring (not shown) is inserted on the upper inner periphery of the outer case 16 and a groove is made on the upper outer periphery of the outer case to form a concave portion at the upper end of the vibration preventing ring. Thereafter, an electrolyte of potassium hydroxide (KOH) of 30% by weight is injected into the outer case 16. A sealing plate is arranged in the upper portion of the outer case 16 so that its bottom is brought into contact with the cylindrical portion of the positive polarity lead 16.

A positive polarity cap (positive polarity terminal) 18 is provided on the upper portion of the sealing plate 17 and a plurality of projections 18a are formed on the upper surface of the positive polarity cap 18. The projections 18a are provided to concentrate the welding current. When the welding current is passed between the adjacent unit cells as described above, the welding current is concentrated at the contact portion between the projections 18a and the bottom of the opposite outer case 16, thereby assuring the welding. Incidentally, the positive polarity cap 18 incorporates a valve composed of a valve plate 17a and a spring 17b. The sealing plate 17 has a gas vent at its center portion. The sealing plate 17 and the positive polarity cap 18 constitute a sealing body.

An insulating gasket 16x is fit on the periphery of the sealing plate 17. Using a pressing machine, pressure is applied to the sealing plate 17 so that the sealing plate 17 is squeezed into the outer case 16 until the lower end of the insulating gasket 16x reaches the position of the concave portion formed on the upper outer periphery of the outer case 16. Thereafter, the opening terminal edge of the outer case 16 is swaged inwardly to seal the battery, thus completing a nickel-oxygen battery.

In the example of the unit cell suited to manufacture the battery module described above, the plurality of projections 18a were provided on the upper surface of the positive polarity cap 18. However, as shown in FIG. 6, a plurality of projections 16a may be provided on the bottom of the outer case 16, thereby proving the same result.

Further, although it was explained that the sealing body serves as a positive polarity terminal while the outer case serves as a negative polarity terminal, the sealing body can be used as the negative polarity terminal while the outer case can be used as the positive polarity terminal.

The above explanation has been given of the embodiment in which this invention is applied to the Ni—H battery. However, it is apparent that this invention can be applied to not only the Ni—H battery but also other batteries such as the Ni—Cd battery.

3. Variation 3

A connecting member 80 between the cells in a variation 3 is made of a cap formed integrally by pressing a metal plate having excellent conductivity such as iron, copper, nickel or alloy thereof shown in FIGS. 7A–D. This connecting member 80 can be formed easily by pressing a metal plate. And projections T are made of bars formed during the step of pressing.

Further by using these connecting members, welding connection can be done easily in the case of parallel connection.

4. Variation 4

Figure 8A:
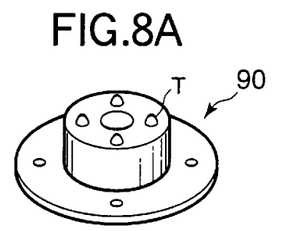
FIGS. 8A and B are views of a connecting member used in the variation 4 of the present invention.
Figure 8B:
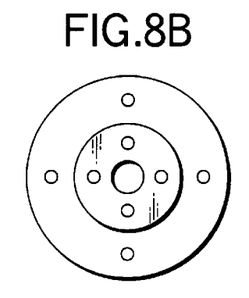

A connecting member 90 between the cells in a variation 4 is made of a cap having a hole and formed integrally by pressing a metal plate having excellent conductivity such as iron, copper, nickel or alloy thereof shown in FIGS. 8A-B. This connecting member 90 an be formed easily by pressing a metal plate. And projections T are made of bars formed during the step of pressing.

5. Variation 5

Figure 9A:
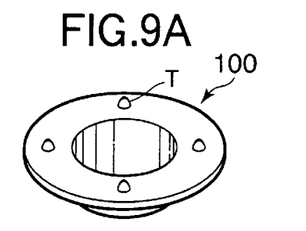
FIGS. 9A and B are views of a connecting member used in the variation 5 of the present invention. enlarged sectional view of the connecting portion between the FIG. 10 is a front view of a conventional battery module.
Figure 9B:
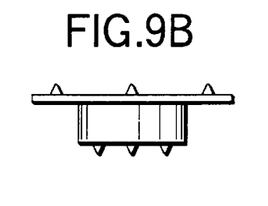

A connecting member 100 between the cells in a variation 6 is made of a cap having a hole and formed integrally by pressing a metal plate having excellent conductivity such as iron, copper, nickel or alloy thereof shown in FIGS. 9A–B. This connecting member 100 is used in upside down state of the connecting member 80 of the variation 4.

What is claimed is:

1. A method for manufacturing a battery module comprising the steps of:
   preparing a plurality of unit cells each provided with a metallic case serving as a terminal with one polarity and incorporating cell elements with a positive electrode and a negative electrode with an electrolyte interposed therebetween and a sealing body serving as a terminal with the other polarity electrically isolated from the metallic case;
   aligning the plurality of unit cells in a line so that their adjacent terminals are brought into contact with each other; and
   welding the adjacent terminals to each other by passing a welding current through at least one battery elements of the plurality of unit cells aligned in a line.

2. A method of manufacturing a battery module according to claim 1, wherein the step of aligning is to align the plurality of unit cells in a line so that the bottom of the case with the one polarity of the one unit cell of the adjacent unit cells is brought into contact with the terminal with the other polarity of the other unit cell; and comprises
   a welding electrode arranging step of arranging a pair of welding electrodes so that they are brought into contact with the surfaces of the cases of any two unit cells of the plurality of unit cells aligned in a line, respectively; and
   welding the plurality of unit cells at their both ends located between the welding electrodes to each other by passing a welding current between the welding electrodes.

3. A method of manufacturing a battery module according to claim 2, wherein the welding electrode arranging step is to arrange the welding electrodes on one of the terminals of outermost unit cells of the plurality of unit cells and the side wall of one of the other units thereof.

4. A method of manufacturing a battery module according to claim 2, wherein the welding electrode arranging step is to arrange a pair of welding electrodes so that they are brought into contact with the surfaces of the cases of any two unit cells of the plurality of unit cells aligned in a line, respectively.

5. A method of manufacturing a battery module according to claim 1, wherein the terminal with the other polarity is a sealing body which seals the opening of the case serving as the terminal with the one polarity through an insulator, and the welding step comprises a step of passing a welding current between the pair of welding electrodes while both ends of the plurality of unit cells aligned in a line are pressurized by pressurizing members so that the sealing body of the one unit cell and the bottom of the case of the other unit cells of the adjacent unit cells are welded, thereby connecting the plurality of unit cells in series.

6. A method for manufacturing a battery module according to claim 5, wherein in the welding step, a welding voltage is applied between the pair of welding electrodes so that the welding current flows from the outer case of the unit cell on which the one welding electrode is arranged through the interior of a unit cell located between any two unit cells on which these welding electrodes are located, the interior of the unit cell on which the other welding electrode is arranged and the outer case thereof.

7. A method for manufacturing a battery module according to claim 5, wherein the any two unit cells are two unit cells which are adjacent to each other.

8. A method for manufacturing a battery module according to claim 5, wherein the any two unit cells are two unit cells which are adjacent to each other so that another unit cell is interposed therebetween.

9. A method for manufacturing a battery module according to claim 5, wherein in the aligning step, the plurality of unit cells are aligned in a line so that an insulator is interposed between the sealing body of the one unit cell and the bottom of the outer case the other unit cell except an contact portion therebetween.

10. A method of manufacturing a battery module according to claim 5, wherein in the aligning step, the plurality of unit cells are aligned in a line so that an connector of a connecting material is interposed between the sealing body of the one unit cell and the bottom of the outer case the other unit cell.

11. A method of manufacturing a battery module according to claim 5, wherein in the aligning step, the plurality of unit cells are aligned in a line so that an connector of a connecting material is interposed between the sealing body of the one unit cell and the bottom of the outer case the other unit cell, the connector being provided with a flange extended to cover a part of the surface of the outer case.

12. A method of manufacturing a battery module according to claim 11, wherein the welding step is to make the welding while at least one of the welding electrodes is kept in contact with a part of the surface of the outer case of the other unit cell.

13. A method of manufacturing a battery module according to claim 1, wherein the welding step is to use a pulse current as the welding current.

* * * * *